United States Patent [19]

Newhall et al.

[11] Patent Number: 4,798,094

[45] Date of Patent: Jan. 17, 1989

[54] HYDROSTATIC PRIMARY FORCE STANDARD

[75] Inventors: Donald H. Newhall, Norfolk, Mass.; Charles D. Bullock, Conowingo; James O. Pilcher, Edgewood, both of Md.

[73] Assignee: The Unites States of America as represented by the Secretary of the Army, Washington, D.C.

[21] Appl. No.: 142,893

[22] Filed: Jan. 11, 1988

[51] Int. Cl.⁴ .......................... G01L 1/02; G01L 25/00
[52] U.S. Cl. ..................................... 73/862.58; 73/1 B
[58] Field of Search .................... 73/862.58, 798, 825, 73/837, 4 D, 1 B

[56] References Cited

U.S. PATENT DOCUMENTS 2,796,229  6/1957  Newhall .
3,296,855  1/1967  Newhall .

*Primary Examiner*—Charles A. Ruehl
*Attorney, Agent, or Firm*—Saul Elbaum; Thomas E. McDonald; Muzio B. Roberto

[57] ABSTRACT

A controlled clearance piston load cell consisting of a piston and pressure jacketed cylinder that has integral to its structure a system of hydrostatic bearings which provide centering of the piston in the cylinder and alignment of the piston-to-cylinder interface. Also, the geometry of the cylinder and pressure jacket is such as to provide the controlled clearance constriction at a predetermined location. When used with a controlled clearance dead weight piston gage, this self-aligning load cell can be utilized as a primary force standard in the calibration of force-measuring devices.

7 Claims, 2 Drawing Sheets

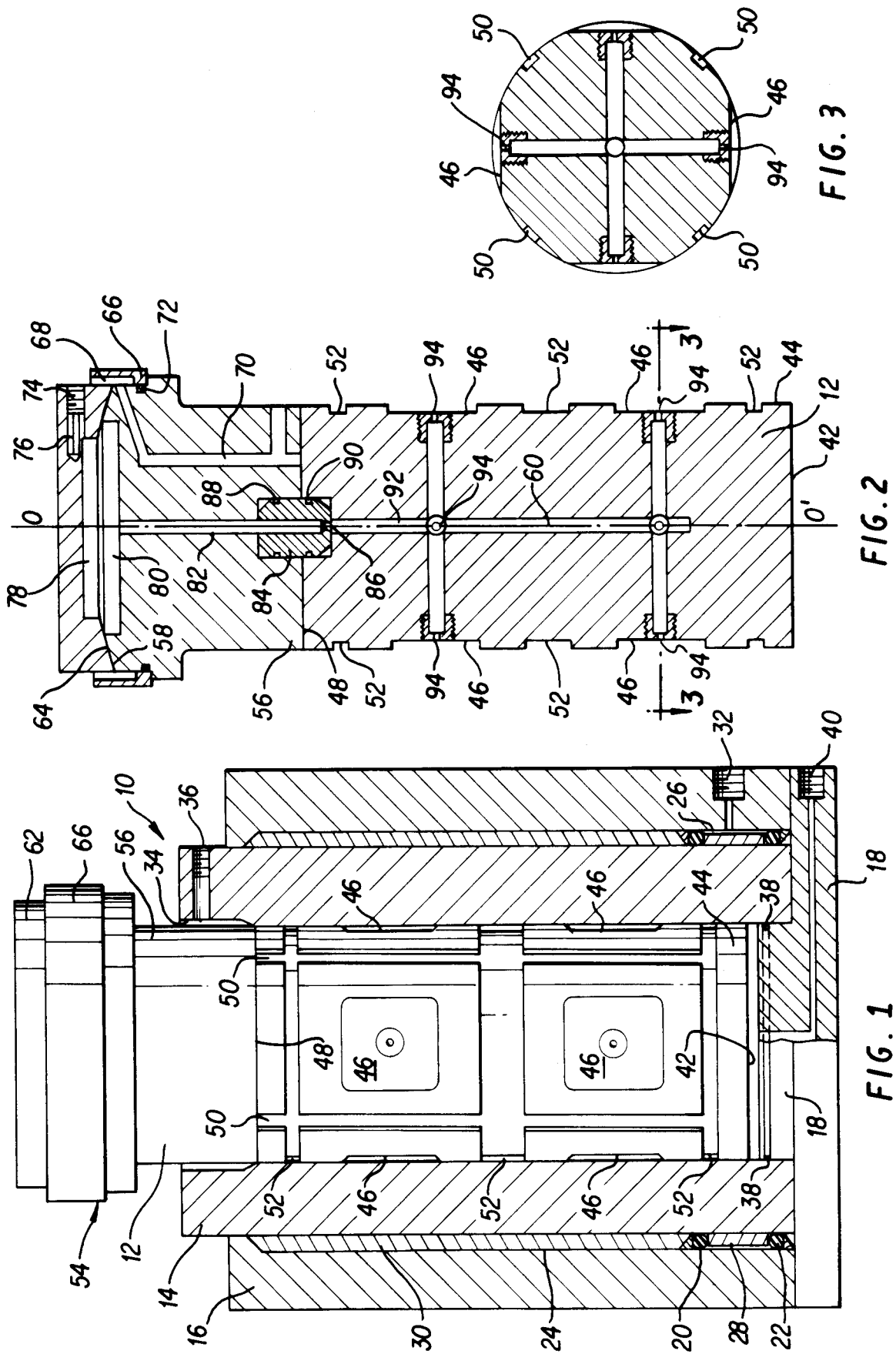

HYDROSTATIC PRIMARY FORCE STANDARD

RIGHTS OF THE GOVERNMENT

The invention described herein may be manufactured, used and licensed by and for the U.S. Government for governmental purposes without payments to us of any royalties thereon.

BACKGROUND OF THE INVENTION

1. Field of The Invention

The invention relates to a controlled clearance piston load cell and to an apparatus for calibrating force-measuring devices which utilizes a controlled clearance piston load cell as a primary standard.

2. Description of Related Art

U.S. Pat. No. 3,296,855, issued Jan. 10, 1967 to D. H. Newhall describes a controlled clearance piston load cell which is capable of extremely accurate and dependable measurements over a range from few to several million pounds. The load cell includes a base, a metallic cylinder supported on the base to rotate on a vertical axis, a piston disposed within and having a leakage fit clearance with the cylinder for movement thereto, and a plug disposed within the cylinder below the piston having a leakage fit clearance with the cylinder and forming with the base a bottom closure for the cylinder. Pressurized fluid is introduced to the cylinder between the piston and the plug to balance the piston against an external force to be measured, which acts on the top end of the piston. The cylinder is surrounded by a jacket which forms an annular cavity extending almost the entire length of the cylinder. Pressurized fluid is applied to this cavity to contract the cylinder radially and maintain the proper leakage fit clearance between the cylinder and the piston and between the cylinder and the plug. This load cell does not allow any adjustment for load misalignment. Consequently, a rotary oscillatory or vibratory movement must be imparted to the cylinder while the load cell is in use to free the piston of any tendency to stick to the interior wall of the cylinder and thus insure a free floating relationship between the piston and cylinder. Also, great care must be taken to assure proper alignment of the loading apparatus used with this load cell.

In the past, force gages have been calibrated by one of three methods: (1) the application of calibrated weights to the load surface of the gage; (2) the interposition of calibrated load rings between the gage and the load; and (3) the direct comparison of the gage response to the response of another gage or device under the same load.

The accepted primary standard for calibrating a force gage is the dead-weight method, which subjects the gage to a precisely known amount of dead weight. The National Bureau of Standards (NBS) uses this technique for forces ranging to 1,000,000 pounds. Dead-weight calibration systems are loading frames whose upper cross-members form a pendulum in conjunction with the load weights attached at the bottom. These machines require shelters which are several stories high and must be climatically controlled. Consequently, this technique requires a massive initial investment as well as large maintenance and operational costs. This technique for large forces ia available as a primary standard soley at NBS at great expense to the user. This technique does not economically lend itself to implementation in small calibration or production facilities.

A more commonly used method to calibrate testing equipment and load cells is the load ring method. The load ring is a short, hollow, steel cylinder with two diametrically located saddle bosses used to apply an unknown load perpendicular to the cylinder's longitudinal axis. As the load is increased, the length of the internal diameter which passes through the center of the bosses is measured by various means until a predetermined shortening is achieved. By previous calculation and calibration, this change in diameter represents a precise load. While this method is fine for static calibrations of particular points in both tension and compression, the inherent nonlinearity of the rings structural geometry render them unsuitable for dynamic calibration. In order to use ring loads over a wide range of applied forces, numerous sets of rings are required. Because of their thermal stress response and sensitivity to environmental and use conditions, load rings are generally used as secondary standards to calibrate laboratory or operating standards in well-controlled environments. The precision of this method is dependent on the method of measuring diametrical deflection and its accuracy is dependent on environmental control of temperature.

The third and most common method of calibrating load cells and force gages is the comparison of the components response against some known output, either from a well-characterized testing machine or other force generators. This method is used in various forms in calibration laboratories and production lines. The main constraint in using this method is the maintenance of the working standards, since these systems receive heavy use. This technique relies on close control and observation of the process to maintain accuracy and tends to be susceptible to operator error and to environmental errors, which tend to accumulate with time.

SUMMARY OF THE INVENTION

It is a primary object of the invention to provide a controlled clearance piston load cell which includes a self-adjusting load alignment mechanism with a high lateral stiffness.

It is another object of the invention to provide a compact, relatively inexpensive apparatus for calibrating force-measuring devices, in which a controlled clearance piston load cell is used as a primary or secondary force standard.

In the preferred embodiment of the invention, the load cell includes a metallic cylinder having one end affixed to and enclosed by a base, and an opposite open end. A piston is slidably disposed within the cylinder for limited movement therein along the cylinder axis. The piston includes a loading end which extends out of the open end of the cylinder for engagement with a load, a central or intermediate portion, and an opposite inner end having a precise radial leakage clearance with the cylinder when the piston and cylinder axes coincide. The cylinder is disposed within a jacket, which, with the cylinder, forms an annular cavity extending about a cylinder along the axial path of travel of the piston inner end.

The piston includes two mechanisms for improving its operation over that of prior known controlled clearance piston load cells: (1) a piston centering mechanism for maintaining the cylinder and piston axis coincident, and (2) a load misalignment adjusting mechanism. The piston centering mechanism includes two axially-spaced circumferential arrays of hydrostatic bearings disposed in the central portion of the piston, each array including at least three hydrostatic bearings disposed at equal intervals about the piston circumference. The load misalignment adjusting mechanism includes a spherical hydrostatic thrust bearing disposed at the loading end of the piston. The thrust bearing includes an outer pad which is pivotable over a limited range in any direction about a center of curvature which is disposed on the piston axis halfway between the two arrays of hydrostatic bearings. This thrust bearing pad includes an outer surface for engagement with the load. The spherical hydrostatic thrust bearing and each hydrostatic bearing of the two arrays are connected to a common source of pressurized fluid. Together, the two mechanisms constitute a self-adjusting load alignment mechanism with a high lateral stiffness, eliminating the need for rotation of the piston with respect to the cylinder and the need to precisely align the loading mechanism used with the device.

This load cell is used in the same manner as the load cell described in the above referenced U.S. Pat. No. 3,296,855. Fluid at a precisely determined pressure is applied to the cylinder between the inner end of the piston and the base, to move the piston thrust bearing pad into engagement with the load. At the same time, pressurized fluid is supplied to the annular cavity surrounding the lower portion of the cylinder of sufficient pressure to contract the cylinder radially within the limits of elasticity and maintain the precise radial leakage clearance between the piston inner end and the cylinder. Thus, a precise force determined by the pressure of the fluid supplied to the cylinder, is applied to the load.

The accuracy to which the force applied to the load is determined depends directly upon the accuracy of regulating and measuring the pressure of the fluid supplied to the cylinder. Consequently, when this load cell is used as a primary force standard to calibrate various force-measuring devices, the pressure of the fluid supplied to the cylinder must be maintained and measured by an extremely accurate device, such as a controlled clearance dead weight piston gage. When this load cell is used as a secondary or working standard, the pressure of the fluid applied to the cylinder can be measured by a dead weight piston gage, a precision bourdon gage, a mangannon cell or another precision pressure transducer.

BRIEF DESCRIPTION OF THE DRAWINGS

The invention will be better understood and further objects, features and advantages thereof will become more apparent from the following description of preferred embodiments, taken in conjunction with the accompanying drawings in which:

FIG. 1 is a side view of a controlled clearance piston load cell, according to the invention, in which the cylinder, jacket, and a portion of the base are shown in cross section, to allow an unobstructed view of the piston disposed therein;

FIG. 2 is a vertical or axial cross sectional side view of the piston in the embodiment of FIG. 1;

FIG. 3 is a horizontal or radial cross sectional view of the piston in the embodiment of FIG. 1, taken along the line 3—3 of FIG. 2;

DESCRIPTION OF PREFERRED EMBODIMENTS

Figure 5:
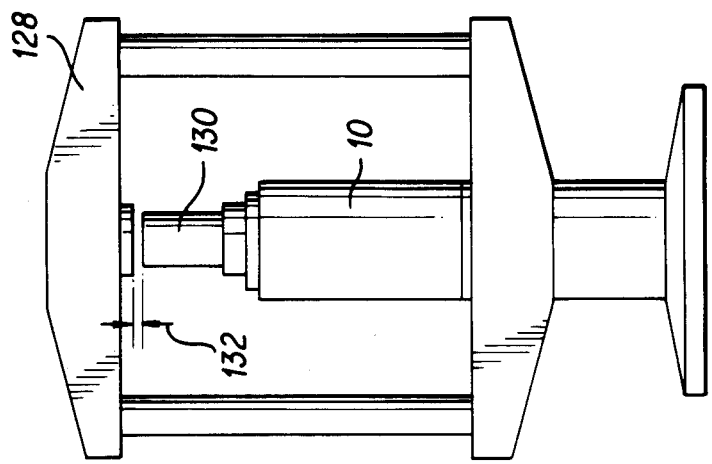
FIG. 5 is a side view of a load frame having the controlled clearance piston load cell of FIG. 1 and a load cell to be calibrated mounted therein.

Referring now to FIGS. 1–3, a controlled clearance force cell 10 includes a piston 12 nested inside a cylindrical sleeve 14 which, in turn, is encased in a cylindrical jacket 16 and closed at its bottom end by a base 18. Two annular jacket reservoir seal assemblies 20, 22 are disposed in the lower portion of an annular space 24 between the sleeve 14 and the jacket 16. These seal assemblies 20, 22 are spaced apart to define, with the sleeve 14 and jacket 16, a jacket pressure reservoir 26 containing a reservoir stuffing ring 28. Also, a stuffing sleeve 30 is disposed in the upper, unpressurized portion of the space 24. The jacket 16 contains a jacket pressure supply port 32 connecting to the jacket reservoir 26. The inner diameter of the sleeve 14 is enlarged at its upper end to define, with the piston 12, a fluid return reservoir 34. The sleeve 14 includes a fluid return port 36 extending from the fluid return reservoir 34. The base 18 includes a base/cylinder interface seal 38 and a primary pressure port 40 in communication with the inner end 42 of the piston 12.

The piston 12 includes a controlled clearance zone 44 which extends about the piston periphery adjacent the piston inner end 42 and which has a precise radial leakage clearance with the cylinder 14 when the piston and cylinder axes coincide. The piston also includes two axially-spaced circumferential arrays of hydrostatic bearing recesses 46 intermediate the loading end 48 and the inner end 42 of the piston 12. Each array includes four hydrostatic bearing recesses 46 disposed at equal intervals about the piston circumference. The piston also includes four axially-extending fluid return channels 50 and three annular fluid return channels 52.

A spherical hydrostatic thrust bearing 54 disposed at the loading end 48 of the piston 12 includes a thrust bearing pad 56 affixed to the piston loading end 48. The thrust bearing pad 56 includes a spherical top surface 58 having a center of curvature 60 located on the central axis 0–0' of the piston 12 midway between the two circumferential arrays of hydrostatic bearing recesses 46. The hydrostatic thrust bearing 54 also includes a runner 62 having an inner spherical surface 64 which conforms to, and is supported by, the spherical surface 58 of the thrust bearing pad 56, so that the runner 62 is pivotable over a limited range in any direction about the center of curvature 60 of the thrust bearing pad 54. The pivotal movement of the runner 62 is limited by an alignment collar 66 which extends about the runner 62. The upper portion of the alignment collar 66 is spaced from the thrust bearing pad 56 to form therebetween an annular overflow reservoir 68 which is connected to the fluid return reservoir 34 by an interior fluid return channel 70 formed in the thrust bearing pad 54. The lower portion of the alignment collar 66 is secured to the thrust bearing pad 56 via an interface which includes an O-ring seal 72.

The bearings supply manifold for the control clearance force cell 10 includes a bearing pressure input port 74 which is connected by an interior channel 76 through the runner 62 to a runner recess 78. Facing the runner recess 78 and communicating with it is a thrust bearing pad recess 80. This recess 80 is connected by another interior channel 82 through the thrust bearing pad 56 to a first-stage pressure reduction assembly 84 which is disposed between the thrust bearing pad 56 and the piston 12 and which contains a metering orifice 86. A first O-ring seal 88 is disposed between the pressure reduction assembly 84 and the thrust bearing pad 56, and a second O-ring seal 90 is disposed between the pressure reduction assembly 84 and the piston 12. The metering orifice 86 is connected through an interior pressure manifold 92 of the piston 12 to eight second-stage orifices 94, located respectively at the bottom of the eight hydrostatic bearing recesses 46. When thus supplied with pressurized fluid, the eight hydrostatic bearing recesses 46 and adjacent portions of the sleeve 14 constitute hydrostatic bearings which maintain the cylinder and piston axes coincident.

Figure 4:
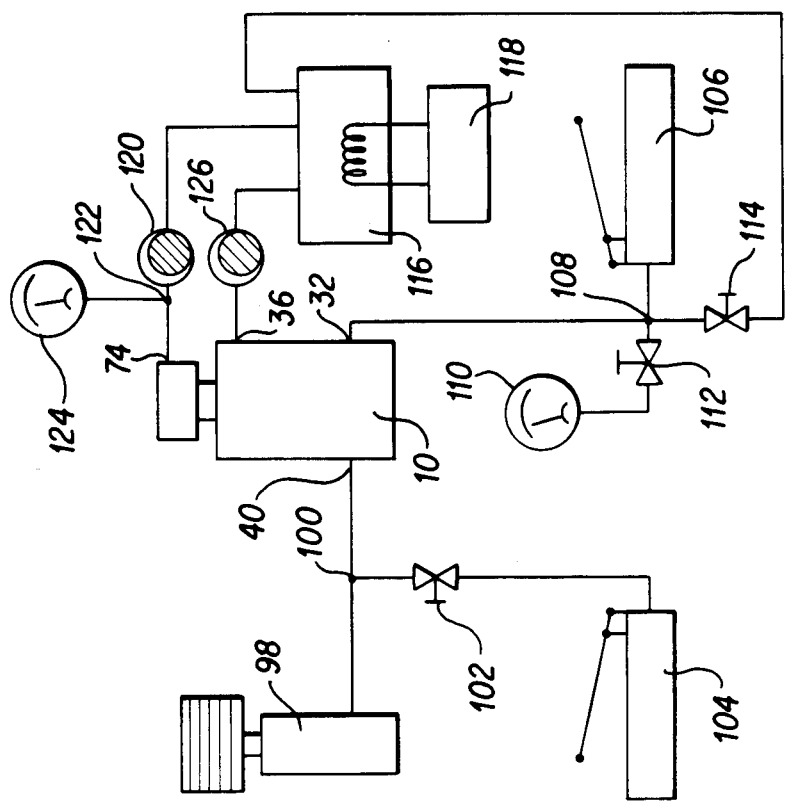
FIG. 4 is a schematic diagram of a calibration system, according to the invention, for calibrating force-measuring devices against a primary standard.

In the system shown schematically in FIG. 4, the self-aligning controlled clearance force cell 10 of FIGS. 1-3 is utilized as a primary force standard. The primary pressure port 40 of the force cell 10 is connected directly to a controlled clearance piston gage 98 through a "T" connector 100, which also connects the force cell 10 and the piston gage 98 through a constant volume valve 102 to a hydraulic pressure generator 104. A second hydraulic generator 106 is connected to the jacket pressure supply port 32 of the force cell 10 through a cross connector 108 which is also connected to a precision pressure gage 110 by a valve 112. The remaining arm of the cross connector 108 is connected through a fluid return valve 114 to a fluid return reservoir 116 cooled by a refrigeration system 118. The fluid return reservoir 116 is connected through a constant pressure pump 120 and a T connector 122 to the bearing pressure input port 74 of the force cell 10. The remaining arm of the T connector 122 is connected to another pressure gage 124. The fluid return port 36 of the force cell 10 is connected to the fluid return reservoir 116 through the fluid return pump 126.

DESCRIPTION OF OPERATION

The self-aligned control clearance force cell 10 is mounted in a load frame 128 with a load cell 130 to be calibrated, as shown in FIG. 4. The operation parameters as given herein are based on calibrating the load cell 130 at one hundred thousand pounds. An initial gap 132 is set in the system to allow the piston of the load cell 130 to float at a desired height (approximately one-half inch) during the test. The constant pressure pump 120 and the fluid return pump 126 are activated to pressurize the bearing system at about 400 pounds per square inch. This assures that the piston 12 of the force cell 10 is centered in the cylinder sleeve 14 and that any load on the piston 12 due to misalignment of the load frame is compensated by the thrust bearing pad 56. As described above, the thrust bearing pad 56 has its center of curvature 60 located on the central axis 0-0' of piston 12 midway between the two circumferential arrays of the hydrostatic bearing recesses 46. This arrangement transmits any lateral forces to the hydrostatic bearings, provides sufficient stiffness to eliminate the occurrence of lateral loads and misalignments in the controlled clearance zone 44, and also prevents scoring or binding of the cylinder/piston interface. The hydrostatic bearings also offer a balanced flow field along the length of the piston 12, with low friction coefficients reducing the tare forces, and thus the uncertainty in the system.

Next, the primary jacket pressure generators 104, 106 are activated and set to 5% of operating pressure; the fluid return valve 114 is closed. While maintaining a jacket to primary pressure ratio of about 0.8, the two pressures are gradually elevated to their respective operating levels of 1,600 pounds per square inch and 2,000 pounds per square inch. When the system stabilizes and both the load cell 130 and the controlled clearance piston gage 98 have obtained their desired float conditions, the constant volume valve 102 is closed. This establishes an independent cross float condition between the controlled clearance force cell 10 and the controlled clearance piston gage 98. The fall rate of the system is measured and, if necessary, the jacket is adjusted to achieve the desired fall rate. The output of the specimen load cell 130 is recorded for 100,000 pounds force.

To back the pressure down, the primary and jacket pressure generators 104, 106 are turned off and then the fluid return valve 114 and the constant volume valve 102 are gradually opened. When the pistons of the forced cell 10 and the controlled clearance piston gage 98 have returned to their rest positions, the constant pressure pump 120 is shut off. The fluid return pump 126 is stopped when the return system has fully drained.

ADVANTAGES OF THE INVENTION

This invention delivers to a load cell, testing machine or other force-measuring apparatus a precisely determined force. The device has a demonstrated delivery of 100,000 pounds and a potential delivery in excess of 1,000,000 pounds with delivery ranges from 10% to 100% of designed maximum force to a precision better than 500 ppm and a sensitivity of less than 50 ppm. In addition, the invention features a self-adjusting load alignment mechanism with a high lateral stiffness, eliminating the need for rotation of the piston with respect to the cylinder.

The controlled clearance system by its very nature has a very predictable behavior which can be readily determined by calculation and measurement of controlling parameters such as operating temperature, piston float height, jacket pressure, piston/interface fixture mass, local gravitational acceleration, atmospheric pressure, and driving pressure. The prototype design achieved a maximum uncertainty of 150 ppm at 10% of full range and 50 ppm at 100% full range. The new prototype, which includes active hydrostatic bearings along the piston for low friction alignment and active hydrostatic spherical thrust bearings on the top end of the piston, is expected to reduce this tare by a minimum of one order of magnitude, leaving an uncertainty of 5 to 15 ppm. This allows the system to be used as an accurate primary standard.

The active hydrostatic bearings in the design allow the system to be used without piston rotation, since the lubrication previously provided by the piston rotation is now provided by the active hydrostatic bearing. This feature reduces the complexity of the fixture required to interface the calibration system with the item undergoing test as well as easing the use of the system with production equipment. The active hydrostatic bearing assembly also maintains system alignment, compensating for possible misadjustment of attached load elements and thereby preventing system errors or damage.

The invention is comparable to the NBS dead weight 100,000 pound standard system, which weighs well in excess of 100,000 pounds (the calibrated weights alone weigh 100,000 pounds) and occupies a climatically controlled space over three stories high. The prototype in the 100,000 pound configuration weighs less than 2,500 pounds and is 28 inches high by 18.25 inches square. With the appropriate ancillary equipment, the system would occupy approximately 50 square feet of floor space in a room only seven feet high.

The invention can provide an infinite number of calibration points between 10% and 100% of its design range. Load ring systems can only provide a few calibration points with each ring, and the direct dead weight method is limited by the available combination of weights.

The hydrostatic nature of the invention and the extremely low stress levels generated in the device (less than 2% of the elastic limit), make the invention extremely safe with a fatigue life in excess of 1,000,000 pressure cycles. Because of the minimization of strain energy storage, the hazard of the system popping out of a test frame, commonly experienced with load rings, is nonexistent. The self-aligning feature of the invention further reduces this hazard.

The presently accepted primary standard for force measurement is the dead weight system. The initial cost for installing such a system is $15 per pound of calibration weight plus the cost of the loading structure and housing facility. For a 100,000 pound system, this cost is $1,500,000 for the weights alone, whereas the estimated cost for a complete 100,000 pound controlled clearance primary standard (excluding workspace and utilities) is $120,0000. For a 1,000,000 pound system, this cost is about $250,000 versus $15,000,000 for dead weights. As a secondary and working standard, the invention can be produced for less than $80,000. Thus, the invention is economically feasible as a general use system for small laboratories.

Unlike the standard controlled clearance designed described in U.S. Pat. No. 3,296,855, the length and position of the invention's jacket pressure reservoir 26 is designed to provide constriction of the sleeve 14 in a precise predetermined location. Also, by reducing the axially dimension of the controlled clearance cylinder 44, the portions of the piston 12 and sleeve 14 which must be maintained to very close dimensional tolerances is greatly reduced. In the preferred embodiment described herein, the jacket 16 extends almost the entire length of the sleeve 14, to thus provide additional stiffness and mechanical protection for this sleeve 14. However, since only the lower portion of this jacket 16 encloses the jacket pressurized reservoir 16, the actual length of the jacket 16 could be greatly reduced, to enclose only a lower portion of the sleeve 4.

Although the preferred body of the invention is described herein as a primary standard, it may be used as a secondary or working standard by substituting a dead weight piston gage, a precision bourdon gage, a mangannon cell or another precision pressure transducer for the controlled clearance dead weight piston gage 98, shown in FIG. 4.

In the preferred embodiment described herein, the pressurized fluid is a 50–50 solution of water and glycol with an appropriate rust inhibitor. However, other types of lubricants generally used in load cells can be used in this invention.

In the preferred embodiment described herein, a common pressurized fluid system is utilized for both the spherical thrust bearing 54 and the two arrays of hydrostatic bearings in the piston 12. However, separate pressurized fluid systems can be utilized if desired. Also, in the preferred embodiments described herein, the bearing pressure input port 74 is disposed in the runner 62; however, it could be just as easily disposed in the thrust bearing pad 56. Also, the number of piston hydrostatic bearings in each array is not restricted to four, as described herein, although at least three hydrostatic bearings in each array is necessary to maintain the cylinder and piston axes coincident.

Since there are many other variations, modifications, and additions to the invention which would be obvious to one skilled in the art, it is intended that the scope of the invention be only limited by the appended claims.

What is claimed and desired to be secured by Letters Patent of the United States is:

1. Apparatus for delivering a precisely determined force to a load, comprising:
   a base;
   a cylinder having an axis, one end closed by the base, and an opposite open end;
   a piston which is slidably disposed within the cylinder for limited movement therein along the cylinder axis, the piston including
   an axis,
   a loading end which extends from the open end of the cylinder for engagement with the load, and
   an opposite inner end having a precise radial leakage clearance with the cylinder when the piston and cylinder axes coincide;
   first fluid supply means for supply fluid under a first preselected pressure to the cylinder between the inner end of the piston and the base;
   jacketing means for providing an annular cavity extending circumferentially about a portion of the cylinder adjacent the piston inner end;
   second fluid supply means for supplying fluid under a second preselected pressure to the annular cavity to contract the cylinder portion radially within the limits of elasticity to maintain the precise radial leakage clearance between the piston inner end and the cylinder; and
   piston centering means for maintaining the cylinder and piston axes coincident, including
   two axially-spaced circumferential arrays of hydrostatic bearing recesses disposed intermediate the loading end and the inner end of the piston, each array including at least three hydrostatic bearing recesses disposed at equal intervals about the piston circumference, each hydrostatic bearing recess forming with the cylinder a hydrostatic bearing, and
   third fluid supply means for supplying fluid under a third preselected pressure to each hydrostatic bearing of the two arrays.

2. Apparatus, as described in claim 1, which further comprises load misalignment adjusting means including:
   a spherical hydrostatic thrust bearing disposed at the loading end of the piston, including a runner which is pivotable over a limited range in any direction about a center of curvature of the spherical thrust bearing and which includes an outer surface for engagement with the load; and
   fourth fluid supply means for supplying fluid under a fourth preselected pressure to the spherical thrust bearing.

3. Apparatus, as described in claim 2, wherein the center of curvature of the spherical thrust bearing is disposed on the piston axis midway between the two arrays of hydrostatic bearings.

4. Apparatus, as described in claim 2, wherein the third fluid supply means includes a fluid pump and the fourth fluid supply means includes the same fluid pump.

5. Apparatus, as described in claim 2, wherein the same type of pressurized fluid is supplied to the cylinder, annular cavity, spherical thrust bearing and each hydrostatic bearing of the two arrays.

6. Apparatus, as described in claim 5, wherein the pressurized fluid is a 50-50 solution of water and glycol with an appropriate rust inhibitor.

7. Apparatus, as described in claim 1, wherein the first fluid supply means comprises a dead weight piston gage for measuring and maintaining the pressure of the fluid supplied to the cylinder at the first preselected pressure, whereby the apparatus constitutes a primary force standard.

* * * * *